(12) United States Patent
Fu et al.

(10) Patent No.: US 8,611,644 B2
(45) Date of Patent: Dec. 17, 2013

(54) METHOD AND APPARATUS FOR TRAINING CLASSIFIER, METHOD AND APPARATUS FOR IMAGE RECOGNITION

(75) Inventors: Libo Fu, Shenzhen (CN); Jianyu Wang, Shenzhen (CN); Bo Chen, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 373 days.

(21) Appl. No.: 12/856,856

(22) Filed: Aug. 16, 2010

(65) Prior Publication Data
US 2010/0310158 A1 Dec. 9, 2010

Related U.S. Application Data

(63) Continuation of application No. PCT/CN2009/074110, filed on Sep. 22, 2009.

(30) Foreign Application Priority Data

Sep. 26, 2008 (CN) .......................... 2008 1 0198788

(51) Int. Cl.
*G06K 9/62* (2006.01)
*G06K 9/00* (2006.01)

(52) U.S. Cl.
USPC .......................... 382/159; 382/165; 382/224

(58) Field of Classification Search
None
See application file for complete search history.

(56) References Cited

FOREIGN PATENT DOCUMENTS

| CN | 1704966 A | 12/2005 |
|---|---|---|
| CN | 101178773 A | 5/2008 |
| CN | 100412888 C | 8/2008 |
| CN | 101359372 A | 2/2009 |
| CN | 101251898 B | 9/2010 |

OTHER PUBLICATIONS

Cios et al., "Supervised Learning: Statistical Methods", 2007, Data Mining, Springer.*
Saxe et al., "Toward Robust Skin Identification in Video Images", 1996, Automatic Face and Gesture Recohnition, pp. 379-384.*
Ciocca etr al., "Semantic labeling of digital photos by classification", 2003, Proceedings of the Conference Internet Imaging IV, SPIE 5018.*
Zheng et al., "Shape-based Adult Images Detection", 2004, Image and Graphics, pp. 150-153.*
International Search Report for International Application No. PCT/CN2009/074110, dated Dec. 31, 2009, and English translation thereof.
Chinese Office Action for Chinese Patent Application No. 200810198788.6, dated Dec. 25, 2009, and English translation thereof.

* cited by examiner

*Primary Examiner* — Amir Alavi
*Assistant Examiner* — Kenny Cese (57) ABSTRACT

Embodiments of the present invention provide a method and apparatus for training an image classifier. The method includes: A. dividing a set of training images for classifier training into a positive-example sample set and at least two negative-example sample sets; B. determining, for each negative-example sample set, a feature set for differentiating the positive-example sample set from the negative-example sample set; and C. performing training using each feature set determined to obtain a classifier. This invention also provides a method and apparatus for image recognition utilizing the image classifier.

4 Claims, 6 Drawing Sheets

METHOD AND APPARATUS FOR TRAINING CLASSIFIER, METHOD AND APPARATUS FOR IMAGE RECOGNITION

CROSS-REFERENCE TO RELATED APPLICATIONS

This application is a continuation of International Application No. PCT/CN2009/074110, filed Sep. 22, 2009. This application claims the benefit and priority of Chinese Patent Application No. 200810198788.6, filed Sep. 26, 2008. The entire disclosures of each of the above applications are incorporated herein by reference.

FIELD

The present disclosure relates to image recognition, and particularly to a method and apparatus for training a classifier, and a method and apparatus for image recognition.

BACKGROUND

This section provides background information related to the present disclosure which is not necessarily prior art.

Along with increasingly enriched information provided by Internet, more and more objectionable information arises. The objectionable information such as indecent images, e.g. erotic images and the like, corrupts society value and is harmful to physical and mental health of adolescents. Thus, recognition and interception of such images has become a crucial task of Internet content filtering.

Since most indecent images depicts massive naked human skin and meanwhile detecting naked human skin in an image is much easier than directly judging whether an image is an indecent image, naked human skin detection is an effective heuristic method for indecent image recognition. Through naked human skin detection, highly possible indecent images can be detected and then examined by man, so that manpower examination workload can be remarkably reduced.

One of existing naked human skin detection methods is based on skin-color detection and human body area shape features. According to the method, skin-color or near-skin-color areas in an image to be examined is detected through skin-color detection, then area shape features of the areas are extracted for differentiating human-skin areas from non-human-skin background areas, and after that, a trained classifier makes a judgment.

Existing skin-color detection is mainly based on statistical probability distribution of human skin color. The Bayesian decision method is one of the widely-used skin-color detection methods. According to the method, distributions of skin-color and non-skin-color in a large sample set are calculated. For a given color, a posterior probability that the color is skin color is calculated using the Bayesian equation according to the two distributions. The value of the posterior probability determines whether the area is a skin-color area or a non-skin-color area.

The commonly-used human body area shape features mainly include: an area ratio of a skin-color area to an image area (the skin-color area refers to the area composed of each skin-color pixel, and is not necessarily continuous); an area ratio of the largest skin Blob to the image area (the skin Blob refers to connected area composed of skin-color pixels); the amount of skin Blobs; an area ratio of a skin Blob to a circumscribed rectangular (or a convex hull); the semi-axis length, the eccentricity, the direction and etc. of an equivalent ellipse of the skin Blob; the moment invariant of the skin-color area; and the area of a human face, etc.

Those area shape features are extracted from a set of training images to train a classifier for automatic classification of indecent images and normal images. The training image set includes a positive-example sample set (i.e., composed of indecent images) and a negative-example sample set (i.e., composed of normal images). Features extracted from each sample set are marked with a label of the sample set before used for training the classifier. Classifiers applicable for this purpose mainly include Support Vector Machine (SVM), Multi-Layer Perception (MLP) network, decision tree, etc.

In the priori art, different types of negative-example images are collected to form a negative-example sample set, thus distribution of certain area shape features of the negative-example images becomes more scattered, which enlarges the overlap between features extracted from the positive-example images and features extracted from the negative-example images. For example, many overlapping features of a portrait image from the negative-example images and the indecent images are mandatorily marked with different labels, thus the trained classifier will be over-fitted and the classification plane is distorted, which results in an increased detection error rate of erroneously detected portrait images and an increased detection missing rate for not detected indecent images, as well as an unpredictable impact on the classification result of scene images. Therefore, the trained classifier of the priori art faces problems of high detection missing rate and high detection error rate.

SUMMARY

This section provides a general summary of the disclosure, and is not a comprehensive disclosure of its full scope or all of its features.

Embodiments of the present invention provide a method and apparatus for training an image classifier, so as to reduce the detection missing rate and the detection error rate of a trained classifier.

A method for training an image classifier includes:

A, dividing a set of training images for training a classifier into a positive-example sample set and at least two negative-example sample sets;

B, determining, for each negative-example sample set, a feature set for differentiating the positive-example sample set from the negative-example sample set; and C, performing training using the feature set to obtain a second classifier.

The present invention also discloses an apparatus for training an image classifier, which includes:

a training image set, including a positive-example sample set and at least two negative-example sample sets;

a feature determining module, adapted to determine, for each negative-example sample set, a feature set for differentiating the positive-example sample set from the negative-example sample set; and a feature training module, adapted to perform classifier training using features of each feature set to obtain a classifier.

In the present invention, negative-example sample sets are divided according to categories. A distinguishing experiment may be performed on massive area shape features to find out a feature set for each category of negative-example sample set. The feature sets can be used respectively for differentiating indecent images from a different category of negative-example images. The different feature sets can be used for training multiple classifiers, which greatly reduces the detection missing rate and the detection error rate of the trained classifiers.

Embodiments of the present invention also provide a method and apparatus for image recognition, so as to improve the accuracy of image recognition.

A method for image recognition utilizing the above image classifier includes:

obtaining a skin-color or near-skin-color area of an image to be examined;

extracting at least one area shape feature of a feature set from the skin-color or near-skin-color area, and recognizing the image to be examined according to the at least one area shape feature by a classifier trained using the feature set including the at least one area shape feature.

The apparatus for image recognition according to the present invention includes:

an image skin-color area detecting module, adapted to obtain a skin-color or near-skin-color area in an image to be examined; and a classifier, adapted to extract at least one area shape feature of a feature set from the skin-color or near-skin-color area, and to recognize the image to be examined according to the at least one area shape feature.

In the present invention, the area shape features in the classifier for recognizing the image to be examined are the area shape features having better distinguishability that is obtained from the distinguishing experiment for each type of negative-example sample set, which improves accuracy for differentiating indecent images from different categories of negative-example images, and therefore accuracy of indecent image recognition can be improved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1A:
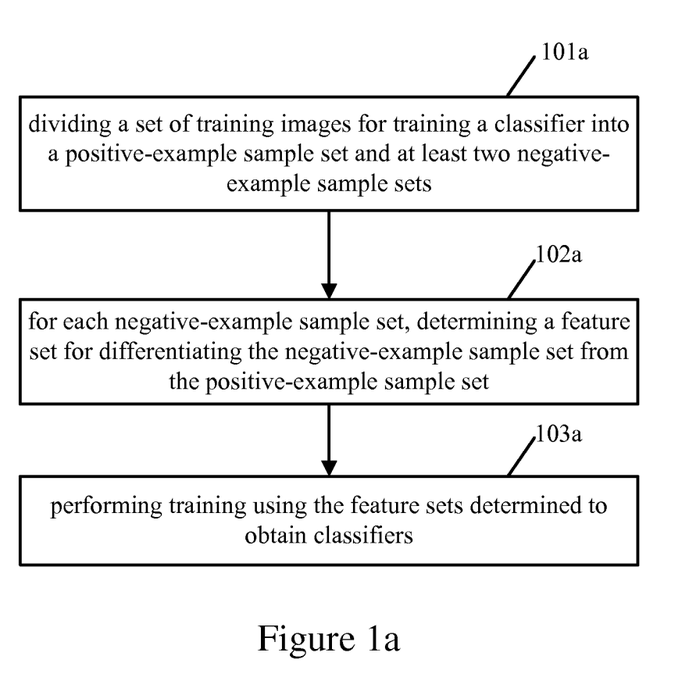
FIG. 1a is a flowchart illustrating a basic procedure for training an image classifier according to an embodiment of the present invention.

FIG. 1a is a flowchart illustrating a basic procedure for training an image classifier according to an embodiment of the present invention. As shown in FIG. 1a, the procedure may include steps as follows.

In step 101a, a set of training images for training a classifier is divided into a positive-example sample set and at least two negative-example sample sets.

In the priori art, a set of training images is only divided into one positive-example sample set and one negative-example sample set (e.g. the positive-example sample set includes indecent images and the negative-example sample set includes any image other than an indecent image), which results in problems such as increased detection missing rate of indecent images and the like. The embodiment of the present invention further divides the negative-example sample of the priori art in hierarchies. For example, the negative-example images may be divided into a first negative-example sample set and a second negative-example sample set and etc. according to practical conditions, e.g., according to the status of overlapping features with the positive-example images and so on. Thus the problem of highly-scattered distribution of certain area shape features of some negative-example images which leads to increased overlapping of features between the positive-example images and the negative-example images can be avoided.

It should be noted that, there is no limit for the number of categories of the positive-example sample set and of the negative-example sample sets. And the number of categories can be adjusted according to practical conditions. As can be seen, in the embodiment of the present invention, all negative-example images are not classified into the same negative-example sample set as in the priori art.

In step 102a, a feature set is determined for each negative-example sample set for differentiating the negative-example sample set from the positive-example sample set.

When the negative-example sample set divided in step 101a includes a first negative-example sample set and a second negative-example sample set, the feature sets determined in step 102a may include: a first feature set for differentiating the first negative-example sample set from the positive-example sample set, and a second feature set for differentiating the second negative-example sample set from the positive-example sample set, with each feature set contains area shape features corresponding to respective negative-example sample sets. The area shape features belonging to each feature set may be determined in various manners depending on specific situation in implementation, for example, may be determined according to settings pre-configured under practical conditions, or according to distributions of the area shape features in the positive-example sample set and in each negative-example sample set. Specifically, the determining according to the distributions of the area shape features in the positive-example sample set and in each negative-example sample set may be as depicted in steps 102b and 103b of FIG. 1b.

In step 103a, training is carried out using the feature sets determined to obtain classifiers.

If the feature sets determined in step 102a respectively includes a first feature set for differentiating the first negative-example sample set from the positive-example sample set and a second feature set for differentiating the second negative-example sample set from the positive-example sample set, step 103a may include: carrying out the training using the first feature set determined to obtain a first classifier, and carrying out the training using the second feature set determined to obtain a second classifier. Step 103a may be described in detailed in step 104b of the detailed procedure illustrated in FIG. 1b.

Through the above steps, the basic procedure provided by the embodiment of the present invention is completed.

Figure 1B:
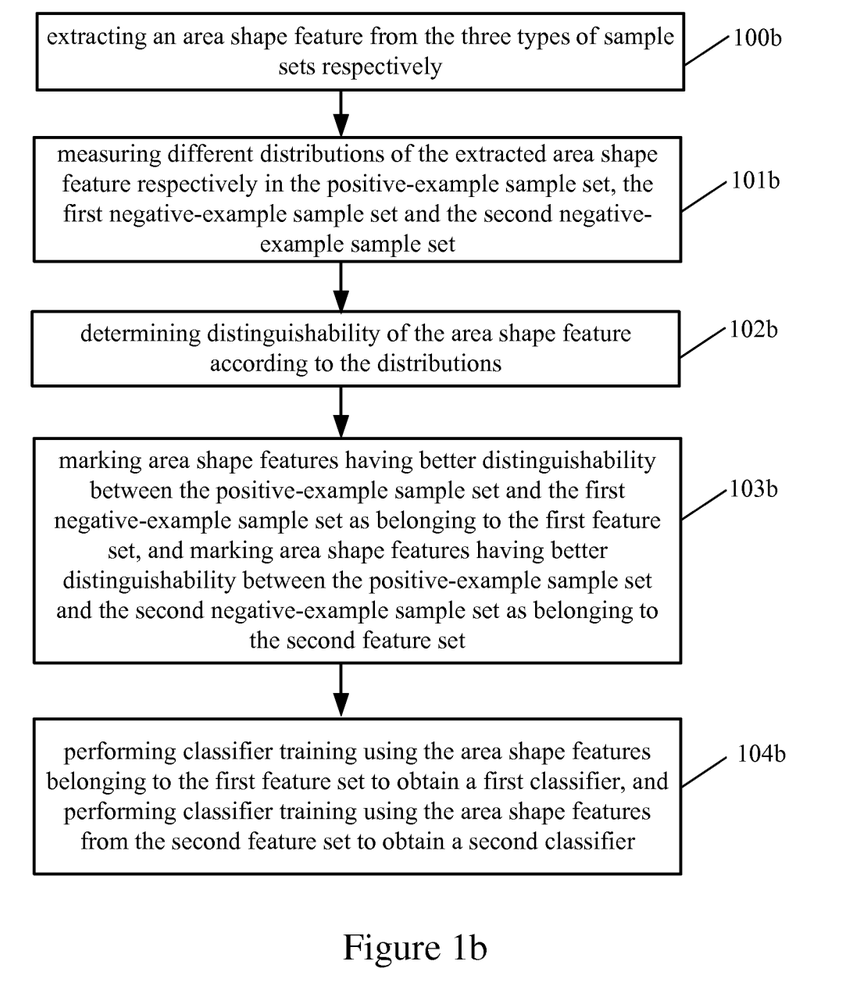
FIG. 1b is a flowchart illustrating a detailed procedure for training an image classifier according to an embodiment of the present invention.

In order to further clarify the method provided by the embodiment of the present invention, the method provided by the embodiment of the present invention is described in detail as follows. FIG. 1b is a flowchart illustrating a detailed procedure for training an image classifier according to an embodiment of the present invention. For facilitating description, this embodiment refers to an example where a negative-example sample set divided into a first negative-example sample set and a second negative-example sample set. One should be clear that the negative-example sample set in the embodiment may be divided further in a manner similar to that illustrated in FIG. 1b and will not be described further in detail herein. In this embodiment, the negative-example sample sets are divided mainly according to a principle associated with the amount of overlapping features with the positive-example sample set. For example, the first negative-example sample set is typically a sample set having the minimal number of overlapping features with the positive-example sample set, and the second negative-example sample set is a sample set having more overlapping features with the positive-example sample set than the overlapping features of the first negative-example sample set with the positive-example sample set. For facilitating description, the embodiment will be described by taking scene images as the first negative-examples, portrait images as the second negative-examples and indecent images as the positive-examples. Of course, the embodiment may use other types of images, and FIG. 1b is merely an example and is not for limiting the scope of the embodiment of the present invention. As shown in FIG. 1b, the procedure may include steps as follows.

When the above training image sets are used for training a classifier, a distinguishing experiment is firstly carried out for area shape features. An area shape feature is extracted from the three types of sample sets respectively (step 100b). Distributions respectively in the positive-example sample set, the first negative-example sample set and the second negative-example sample set of the extracted area shape feature are measured (step 101b). Then, the distinguishability of the area shape feature is determined according to the distributions (step 102b). According to the distinguishability of different area shape features in different sample sets, area shape features having better distinguishability are selected. Within the selected area shape features, area shape features having better distinguishability between the positive-example sample set and the first negative-example sample set are marked as belonging to the first feature set, and area shape features having better distinguishability between the positive-example sample set and the second negative-example sample set are marked as belonging to the second feature set (step 103b). Finally, a classifier is trained using the area shape features from the first feature set to obtain a first classifier, and a classifier is trained using the area shape features from the second feature set to obtain a second classifier (step 104b).

In this embodiment, by performing the distinguishing experiment on the area shape features, it can be concluded that the area shape features for differentiating the scene images from the indecent images may be different from those differentiating the portrait images and the indecent images. Thus, two feature sets are devised in the embodiment for training and generating two types of classifiers which classify to-be-examined images in sequence to reduce the detection error rate of the classifying.

In execution of step 100b, to make the result of the distinguishing experiment better reflect practical conditions, area shape features are selected from largely-varied types of area shape features according to the present invention. Typically, the types of area shape features may include, but not limited to, the following types.

1) Area statistical features

An area ratio of a skin-color area to the image area; the number of skin Blobs; an area ratio of the largest skin Blob to the image area; and the eccentricity (the eccentricity of an ellipse having a moment of inertia equals that of the largest skin Blob), the compactness (a ratio of the length of a Blob contour to the area of the Blob), the near-circularity (an area ratio of the area of the Blob to the area of a circumscribed circle), and the near-rectangularity (an area ratio of the area of the Blob to the area of a minimal circumscribed rectangular) of the largest skin Blob.

2) Contour features

The average value, variance, curvature energy of the contour curvature (the average of the square of the curvature), and the first-order differential energy of the curvature (the average of the square of the first-order differential curvature) of the largest skin Blob; and a low-frequency component and a high-frequency component of contour Fourier descriptor of the largest skin Blob (the low-frequency (high-frequency) component refers to the value of the Fourier descriptor at the lowest-frequency point (highest-frequency point)).

3) Moment invariant features

The Hu moment and Zernike moment (first 8 orders) of the skin-color area; and the Hu moment and Zernike moment (first 8 orders) of the largest skin Blob.

4) Structure component statistical features

The density of edge pixels of the largest skin Blob (an edge pixel refers to a point located on the Canny edge curve of the image); and the number of middle and long straight lines in the largest skin Blob (a middle and long straight line refers to a line containing more pixels than a certain threshold, and can be detected and filtered out by a line detector).

5) Human face related statistical features (for detecting a human face in a portrait image)

An area ratio of a human face Blob to the largest skin Blob; and the ratio of the horizontal/vertical distance between the center of the human face Blob and the center of the largest skin Blob to the height/width of the human face Blob.

In an embodiment of the present invention, at least one of the above types of area shape features may be extracted in step 100b. It should be noted that, other area shape features can also be selected for the feature distinguishing experiment.

Regarding step 101b, the priori art has provided various methods for measuring distributions of the extracted area shape feature in each sample set, e.g. a divergence matrix-based method, a distribution histogram-based method, and so on. In a preferred embodiment of the present invention, the distribution histogram-based method is adopted for obtaining the distributions. The detailed process may be as follows.

Figure 3:
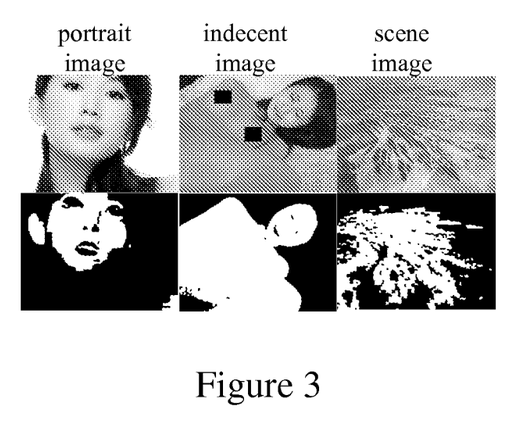
FIG. 3 is a schematic illustrating a skin-color detecting result.

For each area shape feature, a distribution histogram of the area shape feature in each sample set is calculated based on a result of skin-color detection (as shown in FIG. 3). Then, the distribution histogram is normalized. The distribution histogram of the area shape feature of the indecent images is compared with the distribution histogram of the scene images and with the distribution histogram of the area shape feature of the portrait images respectively. Thereafter, an intersection ratio of the distribution histograms is used for evaluating the distinguishability of a positive-example sample set from a certain negative-example sample set over the area shape feature. As an embodiment of the present invention, the intersection ratio of the normalized distribution histograms is the area of an overlapping region of the two normalized distribution histograms.

$$r = \sum_{i=0}^{N-1} \min(H_1[i], H_2[i]) \quad (4)$$

$$\sum_{i=0}^{N-1} H_j[i] = 1, j = 1, 2 \quad (5)$$

Specifically, $H_j[i]$ denotes the value of the area shape feature of the i'th bin in the distribution histogram of the j'th category of samples. N denotes the number of the bins in the distribution histogram. The two categories denoted by j=1, 2 respectively refer to the category of positive examples and the category of a certain type of negative examples (e.g., indecent images and scene images, indecent images and portrait images). Formula (4) defines the intersection ratio, and Formula (5) represents the distribution histogram $H_j$ is normalized.

In step 102b, distinguishability of the area shape feature can be determined according to the above intersection ratio r. A smaller r represents higher distinguishability between two sample sets, e.g., the positive example set and a certain negative example set, over the area shape feature, while a larger r represents lower distinguishability. In implementation, a threshold may be pre-determined according to specific applications. Distinguishability over a certain area shape feature may be determined for each negative-example sample set based on the intersection ratio r of the area shape feature and the threshold.

Through the above feature distinguishing experiment, distinguishability of the indecent images from the scene images over some of the above area shape features are different, and at least one area shape feature may be selected from the area shape features as at least one area shape feature of the first feature set. Specifically, the at least one area shape feature selected may include at least one of the following.

1) The first 3 components of the Hu moment of the skin area; Z22, Z40 and Z42 in the first 4 order Zernike moments of the largest skin Blob; and the near-rectangularity, the curvature energy, the high-frequency component of the Fourier descriptor of the largest skin Blob, etc. It has been proved by experimental data that, a Bayesian classifier trained using probability distributions (e.g. a distribution histogram) of those features in a scene images set and an indecent image set has a general recognition error rate of about 30% when differentiating scene images from indecent images. The above features have relatively low distinguishability in differentiating indecent images from scene images.

2) Z11 in the Zernike moment of the largest skin Blob; and the eccentricity of the largest skin Blob. Experimental data has proved that, a Bayesian classifier trained using probability distributions (e.g., a distribution histogram) of those features in the scene image set and the indecent image set has a general recognition error rate less than 20% in differentiating scene images from indecent images. The above features have moderate distinguishability in differentiating indecent images from scene images.

3) The area ratio of the largest skin Blob to the image area, the compactness and the edge pixel density. Experimental data has proved that a Bayesian classifier trained using probability distributions (e.g., distribution histogram) of those features in the scene image set and the indecent image set has a general recognition error rate less than 10% when differentiating scene images from indecent images. The above features have relatively high distinguishability in differentiating indecent images from scene images.

As an embodiment of the present invention, the above area shape features selected are marked as belonging to the first feature set in step 103b.

Regarding indecent images and common portrait images (including images of human faces):

while guaranteeing that human face can be detected, a Bayesian classifier trained using probability distributions (e.g., a distribution histogram) of human face-related statistical features in a portrait image set and in an indecent image set has a general recognition error rate less than 10% when differentiating portrait images from indecent images, i.e. has distinguishability. Indecent images can be differentiated from portrait images using the above area shape features. As an embodiment of the present invention, the human face-related statistical features are marked as belonging to the second feature set in step 103b.

In step 104b, a first classifier is trained using the area shape features from the first feature set with indecent images forming the positive-example sample set and scene images forming the first negative-example sample set. Then, a second classifier is trained using the area shape features from the second feature set with the indecent images forming the positive-example sample set and portrait images forming the second negative-example sample set. The applicable classifiers mainly include the Support Vector Machine (SVM), the Multi-Layer Perception (MLP) network, the decision tree, etc. As an embodiment of the present invention, both the first classifier and the second classifier may employ a plain Bayesian classifier. Supposing each dimension is independent from each other, the form of the plain Bayesian classifier is as follows:

$$P(c_j | x_1 x_2 \ldots x_N) = \prod_{i=1}^{N} P(c_j | x_i); \quad (1)$$

$$P(c_j | x_i) = \frac{P(c_j)P(x_i | c_j)}{P(c_1)P(x_i | c_1) + P(c_2)P(x_i | c_2)}, j = 1, 2 \quad (2)$$

Specifically, $c_j$, j=1, 2 denotes two categories, i.e. the category of positive examples (indecent images) and the category of the first negative examples (scene images)/the category of the second negative examples (portrait images) respectively. When $c_j$, j=1, 2 respectively denotes the category of positive examples and the category of the first negative examples, the $x_1 x_2 \ldots x_N$ is an N-dimensional vector composed of area shape features from the first feature set. When $c_j$, j=1, 2 respectively denotes the category of positive examples and the category of the second negative examples, the $x_1 x_2 \ldots x_N$ is an N-dimensional vector composed of area shape features from the second feature set. It should be noted that, in embodiments of the present invention, the number of dimensions of the area shape feature vector from the first feature set may be either identical to or different from the number of the dimensions of the area shape feature vector from the second feature set. The two groups may have overlapping, or distinct area shape features.

$P(c_j|x_i)$ in Formula (1) denotes the probability of a certain area shape feature belonging to category $c_j$. Formula (1) generates the distribution probability $P(c_j|x_1 x_2 \ldots x_N)$ of an N-dimensional feature vector belonging to the category $c_j$. Formula (1) is based on an assumption that each dimension of the N-dimensional feature vector is independent from each other in determining which category the feature vector belongs to. Therefore, based on the assumption of Formula (1), when each $P(c_j|x_i)$ j=1, 2; i=1, 2, ... N is given, the posterior probabilities that any sample (whose features is an N-dimensional feature vector $x_1 x_2 \ldots X_N$) belongs to the two categories can be deduced. Through the Bayesian equation in Formula (2), the $P(c_j|x_i)$ may be derived from the priori probability $P(c_j)$ of the two categories and the probability distribution $P(x_i|c_j)$ of the first/second feature set. The priori probability $P(c_j)$ of the two categories in Formula (2) can be determined according to priori service knowledge, and $P(x_i|c_j)$ is the distribution probability of each area shape feature in the positive-example sample set (j=1) or in the negative-example sample set (j=2), and can be estimated from the positive-example sample set and the negative-example sample set.

As described above, the training process of the plain Bayesian classifier is actually a process of calculating $P(x_i|c_j)$ based on the positive-example sample set and the negative-example sample sets.

In addition, according to a preferred embodiment of the present invention with an improved Formula (1), when the first or the second classifier is trained using Formula (1), the components in each dimension of Formula (1) may be weighted in exponent:

$$P(c_j | x_1 x_2 \ldots x_N) = \prod_{i=1}^{N} (P(c_j | x_i))^{\alpha_i} \quad (3)$$

When $c_j$, j=1, 2 denotes the category of positive examples and the category of the first negative examples, $x_1 x_2 \ldots x_N$ is an N-dimensional vector composed of area shape features from the first feature set. When $c_j$, j=1, 2 denotes the positive examples and the second negative examples, $x_1 x_2 \ldots x_N$ is an N-dimensional vector composed of area shape features from the second feature set. The number of dimensions of the area shape feature vector from the first feature set may be either identical to or different from the number of dimensions of the area shape feature vector from the second feature set. The two groups may include overlapping or distinct area shape features. $\alpha_i$ is an exponent weight factor determined according to the intersection ratio, and its value is larger than zero. The higher value of $\alpha_i$ represents a larger weight. A larger weight factor may be applied to a feature having better distinguishability.

The first classifier is obtained by estimating the distribution $P(x_i|c_j)$ of the area shape features from the first feature set in the two categories (the positive examples and the first negative examples, i.e. the indecent images and the scene images) based on the positive-example sample set and the first negative-example sample set. The second classifier is obtained by estimating the distribution $P(x_i|c_j)$ of the area shape features from the second feature set across the two categories (the positive examples and the second negative examples, i.e. the indecent images and the portrait images) based on the positive-example sample set and the second negative-example sample set. Likewise, in an embodiment, the probability histogram may be used for representing the probability distributions, and detailed process may follow the steps of the "feature distinguishing experiment" described in the above.

Figure 2A:
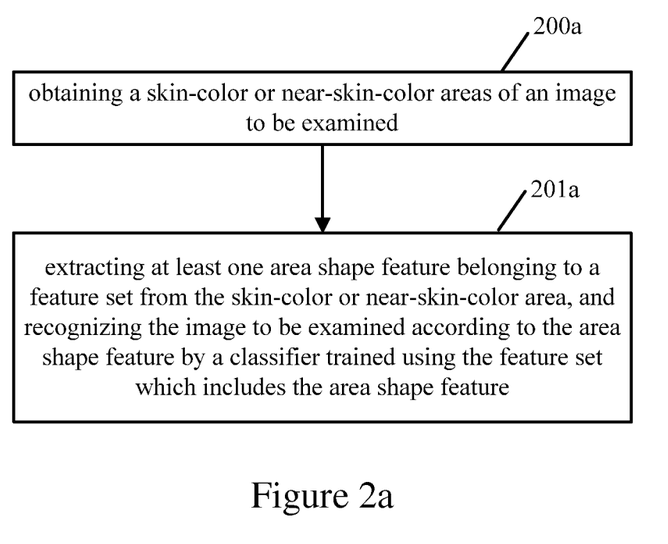
FIG. 2a is a flowchart illustrating a basic procedure of a method for image recognition according to an embodiment of the present invention.

The image classifiers trained according to the above-described method may recognize images from each category. In the following, the method for image recognition utilizing the image classifier described in FIG. 1a will be described. As shown in FIG. 2a, the procedure may include steps as follows.

In step 200a, a skin-color or near-skin-color areas of an image to be examined is obtained.

Figure 2B:
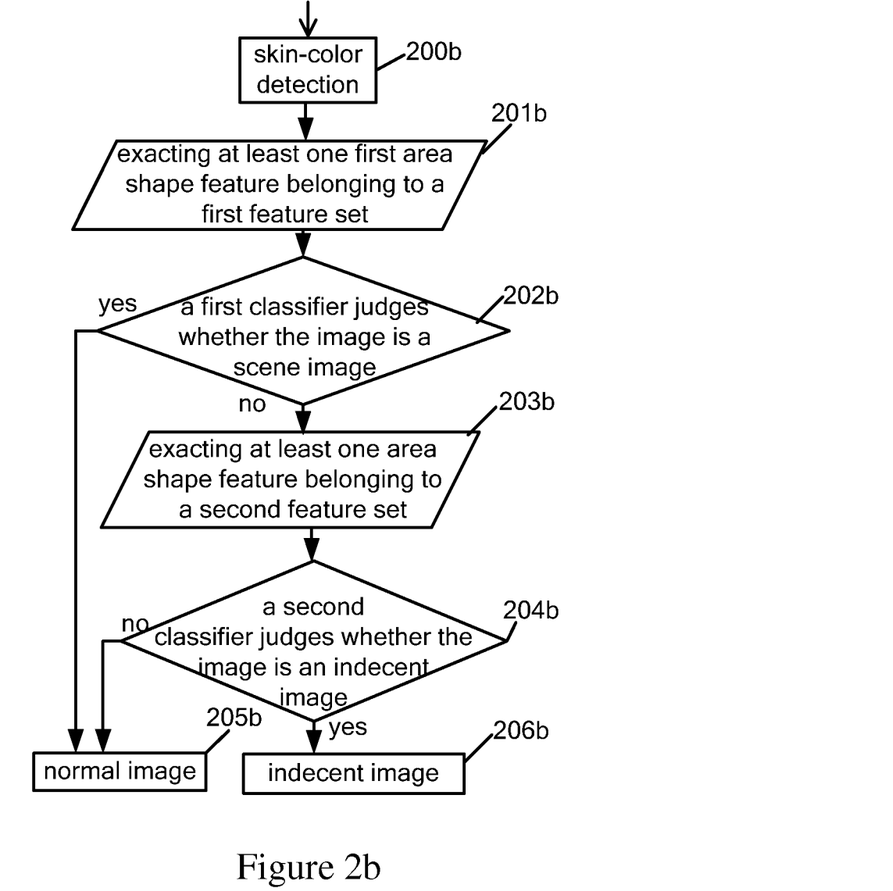
FIG. 2b is a flowchart illustrating a detailed procedure of a method for image recognition according to an embodiment of the present invention.

Here, detailed description of step 200a may be as described in 200b of FIG. 2b, and will not be elaborated herein.

In step 201a, at least one area shape feature belonging to a feature set is extracted from the skin-color or near-skin-color area, and the image to be examined is recognized according to the at least one area shape feature by a classifier trained using the feature set which includes the area shape feature.

The negative-examples are further divided in FIG. 1a, thus the classifier obtained using the method illustrated in FIG. 1a can recognize the image correctly.

For facilitating understanding, the image recognizing procedure using the above classifier provided by the embodiment of the present invention will be described in detail. FIG. 2b is a flowchart illustrating a detailed procedure of a method for image recognition according to an embodiment of the present invention. Generally, a typical usage of an image classifier trained in the above-described manner is for recognizing indecent images. In this embodiment, recognition of indecent images is taken as an example, where a negative-example sample set is further divided into a first negative-example sample set and a second negative-example sample set as illustrated in FIG. 1b, with a positive-example sample set including indecent images, the first negative-example sample set including scene images, and the second negative-example sample set including portrait images. Referring to FIG. 2b together with FIG. 1b, a skin-color or near-skin-color area of an image to be examined in the present invention is firstly detected through skin-color detection (step 200b). At least one first area shape feature belonging to a first feature set is extracted from the skin-color or near-skin-color area (step 201b). The reason of firstly applying the first area shape feature for differentiating the positive-example sample set from the first negative-example sample set mainly lies in that the first negative-example sample set and the positive-example sample set has less overlapping features, which means the detection of an indecent image is easier. If a determination result in this step is yes, the current procedure may be terminated directly for saving resources. Whether the image to be examined is a scene image is judged according to the at least one first area shape feature by using the first classifier obtained based on the above method (step 202b). If yes, the image is determined to be a scene image, i.e. the scene image is a normal image compared with an indecent image (step 205b). If no, a second area shape feature from a second feature set is extracted from the skin-color or near-skin-color area (step 203b). Here, in order to facilitate description, the extracted area shape feature is referred to as the second area shape feature. Whether the image to be examined is an indecent image is judged according to the second area shape feature by using the second classifier (step 204b). If no, the image is determined to be a normal image compared with an indecent image (step 205b). Otherwise, the image is determined to be an indecent image (step 206b), and is then submitted for further examination by man.

In the present invention, a group of area shape features having better distinguishability are chosen on the basis of the feature distinguishing experiment. Higher precision for distinguishing a scene image from an indecent image can be achieved. Moreover, when scene images and portrait images have different distinguishability with indecent images, two feature sets are devised for training two classifiers for respectively processing the two categories of normal images, which greatly improves the accuracy of indecent image recognition.

In step 200b, the Bayesian decision method is a currently widely-adopted skin-color detection method. According to the Bayesian decision method, distributions of skin-color and non-skin-color are calculated based on a large scale sample set. For a given color, a posterior probability that the color is skin-color is calculated using a Bayesian equation according to the two distributions, and it is determined whether the color is skin-color or non-skin-color according to the posterior probability.

Taking skin-color classification of pixel x as an example, suppose that the color of pixel x is "color" likelihood probabilities of x in the two categories are P(color|skin) and P(color|−skin), and the priori probabilities in the two categories are P(skin) and P(−skin). Then the probability that x belongs to skin-color is: P(skin|color)=P(color|skin)/(P(color|skin)+P(color|−skin)). Likewise, the posterior probability P(−skin|color) that x belongs to the non-skin color can be obtained.

The Bayesian decision rule may be denoted as $$P(\text{skin} | \text{color}) \gtrless P(-\text{skin} | \text{color}), \text{ i.e. } P(\text{skin} | \text{color}) \gtrless T.$$

$$T = 0.5, x \in \begin{cases} \text{skin} \\ -\text{skin}. \end{cases}$$

The priori probabilities of the two categories are assumed as identical to each other. Then the posterior probabilities of the above formula may be simplified to be replaced by the likelihood probabilities. It can be proved that, the classification result obtained through the Bayesian decision method has the minimal risk (error rate) in general. The basis of adopting the Bayesian decision method for skin-color detection lies in that the general distribution in the categories should be known, i.e. distribution of the color in the skin-color category and in the non-skin-color category should be calculated based on the large sample set.

In addition, non-human skin colors always overlap more or less with human skin color in natural environment, and the human skin color may vary to some extent under the influences of environmental illumination conditions and/or imaging conditions. Therefore, the skin-color area detected by the skin-color detection technique always includes more or less erroneously detected scene areas in a near-skin color. In addition, portrait images often have large area occupied by skin color, and are relatively difficult to be automatically differentiated from indecent images. If the area shape features extracted from the detected skin-color area have poor distinguishability, mass amount of normal images (natural scene images and portrait images etc. that are covered by near-skin-color) may be erroneously detected as indecent images. As an improvement for the skin-color detection based on the above Bayesian decision method, the present invention may adopt a skin-color detection technique disclosed in an application of the applicant with application No. CN 2008100841302 entitled "METHOD AND APPARATUS for SKIN-COLOR DETECTION". The application provides a training method based on a multi-skin-color probability model, and a method for skin-color detection based on the multi-skin-color probability model. Unlike existing single-skin-color probability model, the multi-skin-color probability model provided includes probability models of multiple skin colors obtained by training using the skin color under various illumination conditions or different types of skin-colors. Therefore, when an image to be detected is processed through skin-color detection, a proper skin-color probability model can be selected for the image to be detected, thus detection error rate or detection missing rate can be reduced. In the following, the skin-color detection technique proposed in the solution will be described in brief for reference. Other details can be found in the application document.

Before skin-color detection, skin color pixels in a training sample set are firstly clustered according to a color space to obtain at least one skin-color chroma class. A candidate skin-color area is extracted from a training sample, the distance between an average of the chroma of the candidate skin-color area and the center of the skin-color chroma class is calculated, and the training sample is sorted into a skin-color chroma class having the minimal distance. Thus training subsets corresponding to the skin-color chroma classes are obtained. Probability distributions of skin-color and non-skin-color of each training subset are statistically calculated to obtain a skin-color probability model for each skin-color chroma class.

Thus, the process of obtaining the skin-color or near-skin-color area of the image to be examined in step 200b may include: extracting a candidate skin-color area from the image to be examined, calculating the distance between an average of the chroma of the candidate skin-color area and the center of a skin-color chroma class, and processing each pixel in the image to be examined through skin-color recognition based on a skin-color probability model of a skin-color chroma class that has the minimal distance, and forming a skin-color or near-skin-color area by pixels recognized as in skin-color.

In step 202b and step 204b, the process of performing classification (recognition) for the image to be examined using the above-described plain Bayesian classifier in an embodiment may be as follows.

A posterior probability $P(c_j|x_1x_2 \ldots x_N)$, $j=1, 2$ obtained by passing the area shape features $x=(x_1x_2 \ldots x_N$ from the first feature set of the image to be examined through the first classifier (e.g., a plain Bayesian classifier) is calculated using the above Formula (1) or (3). Then a Bayesian decision is made using a threshold T:

$$x = (x_1 x_2 \ldots x_N) \in \begin{cases} c_1 & \frac{P(c_1 | x_1 x_2 \ldots x_N)}{(P(c_1 | x_1 x_2 \ldots x_N) + P(c_2 | x_1 x_2 \ldots x_N))} \geq T \\ c_2 & \text{else} \end{cases}$$

The value of T is typically 0.5, and may also be adjusted according to different risks of the two types of classification errors.

$P(c_1|x_1x_2 \ldots x_N)/P(c_1|x_1x_2 \ldots x_N)+P(c_2|x_1x_2 \ldots x_N))$ in the above formula is called a confidence value. If the confidence value is below the threshold T, the image to be examined is recognized as a scene image. Otherwise, the following steps are performed for processing the image to be examined with further recognition.

A posterior probability $P(c_j|x_1x_2 \ldots x_N)$, j=1, 2 obtained by passing the area shape features $x=(x_1x_2 \ldots x_N)$ from a second feature set of the image to be examined through a second classifier (e.g., a plain Bayesian classifier) is calculated. It should be noted that, the number of dimensions of the area shape features from the first feature set may be either identical to or different from the number of dimensions of the area shape features from the second feature set. The two groups may have overlapping or distinct area shape features. Then the Bayesian decision is made based on the threshold T:

$$x = (x_1 x_2 \ldots x_N) \in \begin{cases} c_1 & \frac{P(c_1 \mid x_1 x_2 \ldots x_N)}{(P(c_1 \mid x_1 x_2 \ldots x_N) + P(c_2 \mid x_1 x_2 \ldots x_N))} \geq T \\ c_2 & \text{else} \end{cases}$$

The typical value of T is also 0.5, and may also be adjusted according to different risks of the two types of classification errors, and may be either identical to or different from the threshold T used in the Bayesian decision at the first classifier. There is no necessary relationship between the two thresholds.

If the confidence value $P(c_1|x_1x_2 \ldots x_N)/(P(c_1|x_1x_2 \ldots x_N)+P(c_2|x_1x_2 \ldots x_N))$ is below the threshold T, the image to be examined is recognized as a portrait image. Otherwise, the image to be examined is recognized as an indecent image.

Figure 4A:
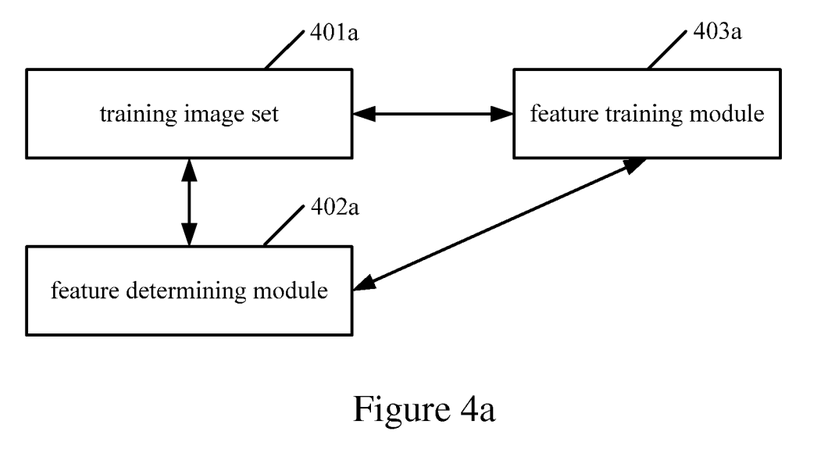
FIG. 4a is a block diagram illustrating a basic structure of an apparatus for training an image classifier according to an embodiment of the present invention.

According to the above method for training a classifier, an apparatus for training a classifier is also provided accordingly by the present invention. Referring to FIG. 4a together with FIG. 1, the apparatus for training an image classifier in the present invention may basically include a training image set 401a which, as described above, may include a positive-example sample set and at least two negative-example sample sets. Preferably, the negative-example sample sets may specifically include a first negative-example sample set and a second negative-example sample set. The apparatus may also include a feature determining module 402a, adapted to determine, for each negative-example sample set, a feature set for differentiating the positive-example sample set from the negative-example sample set; and a feature training module 403a, adapted to perform classifier training using features from the feature set to obtain a classifier.

In order to further clarify the training apparatus provided by this embodiment, the training apparatus is described in detail with reference to the embodiment in the following.

Figure 4B:
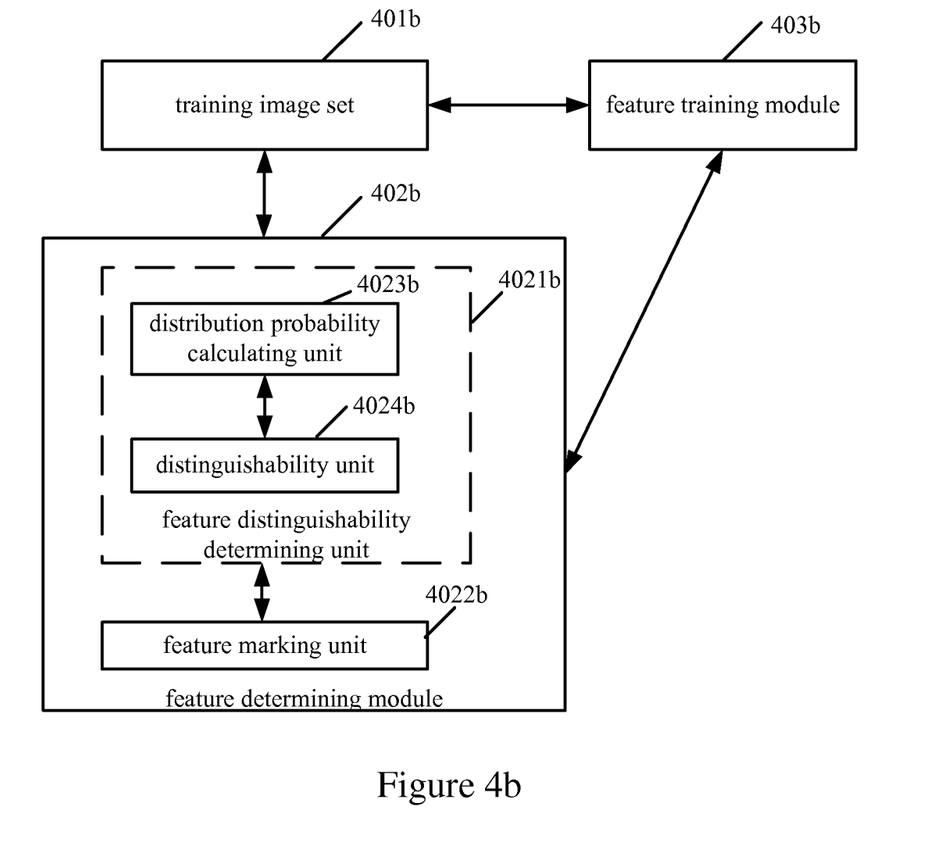
FIG. 4b is a block diagram illustrating a detailed structure of an apparatus for training an image classifier according to an embodiment of the present invention.

FIG. 4b is a block diagram illustrating a detailed structure of an apparatus for training an image classifier according to an embodiment of the present invention. As shown in FIG. 4b, the apparatus may include: a training image set 401b, a feature determining module 402b and a feature training module 403b. Specifically, functions of the training image set 401b, the feature determining module 402b and the feature training module 403b are similar to functions of the training image set 401a, the feature determining module 402a and the feature training module 403a, thus will not be described further herein.

Preferably, if the negative-example sample set in the training image set 401 includes a first negative-example sample set and a second negative-example sample set, the feature determining module 402b as shown in FIG. 4b may specifically include: a feature distinguishability determining unit 4021b and a feature marking unit 4022b.

The operation principle of each unit will be explained in the following. The feature distinguishability determining unit 4021b is adapted to obtain an area shape feature respectively from the positive-example sample set, the first negative-example sample set and the second negative-example sample set; to measure, for each area shape feature, distributions of the area shape feature in the positive-example sample set, the first negative-example sample set and the second negative-example sample set; and to determine distinguishability of the area shape feature according to the distributions. The distinguishability may be determined according to any of the above-described methods, and will not be described further herein.

The feature marking unit 4022b is adapted to mark an area shape features having distinguishability for the first negative-example sample set as belonging to a first feature set, and to mark an area shape feature having distinguishability for the second negative-example sample set as belonging to a second feature set according to a result of a distinguishing experiment performed by the feature distinguishability determining unit 4021b. Therefore, the feature training module 403b is adapted to perform training using the first feature set determined to obtain a first classifier, and to perform training using the second feature set determined to obtain a second classifier.

In addition, the first feature set in the apparatus may further include at least one of a first feature subgroup, a second feature subgroup, and a third feature subgroup. Each feature subgroup includes a type of area shape features having good distinguishability that are obtained through the distinguishing experiment. For example, the first feature subgroup may include at least one of the following area shape features: the first 3 components of the Hu moment of a skin-color area; Z22, Z40 and Z42 in the first 4 order Zernike moments of the largest skin Blob; and the near-rectangularity, the curvature energy, the high-frequency component of the Fourier descriptor of the largest skin Blob. The second feature subgroup may include at least one of the following area shape features: Z11 in the Zernike moment of the largest skin Blob; and the eccentricity of the largest skin Blob. The third feature subgroup may include at least one of the following area shape features: the edge pixel density and the compactness of the largest skin Blob, and the area ratio of the largest skin Blob to the image area.

As an embodiment of the present invention, the feature distinguishability determining unit 4021b as illustrated in FIG. 4b may include:

a distribution probability calculating unit 4023b, adapted to calculate a distribution histogram for the distributions of each area shape feature in the positive-example sample set, in the first negative-example sample set and in the second negative-example sample set respectively; and a distinguishability unit 4024b, adapted to normalize the distribution histogram and determine an intersection ratio of the normalized distribution histogram, and to determine distinguishability of the area shape feature according to the intersection ratio.

The apparatus for training an image classifier as illustrated in FIG. 4a or FIG. 4b may be implemented according to any of the above-described methods for training a classifier, and the implementation thereof will not be elaborated herein. It should be noted that, the apparatus for training a classifier shown in FIG. 4a or FIG. 4b is merely an example for executing the method for training a classifier, and is not the only materialized apparatus capable of implementing the method for training a classifier.

Figure 5:
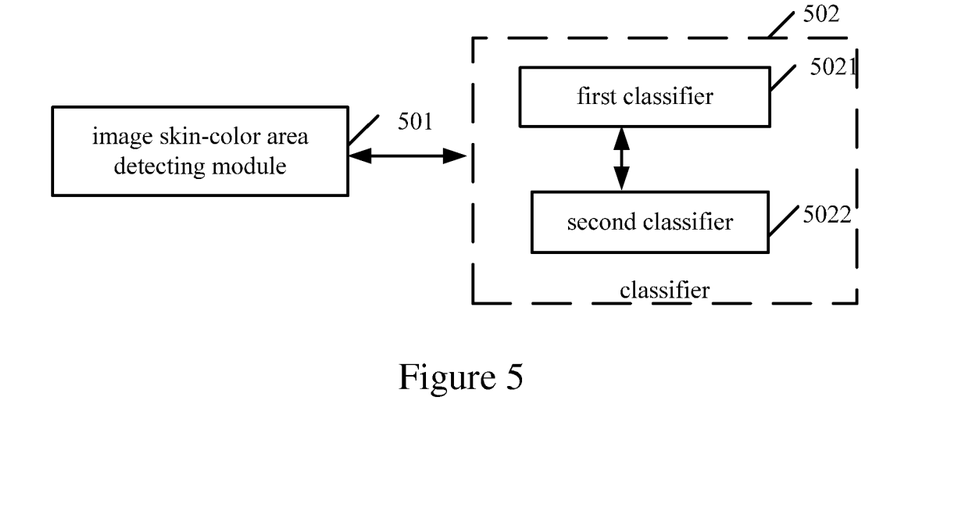
FIG. 5 is a block diagram illustrating a principle of an apparatus for image recognition according to an embodiment of the present invention.

According to the above method for image recognition, an apparatus for image recognition is also provided by the present invention. Referring to FIG. 5 together with FIG. 2, the apparatus for image recognition may include a skin-color area detecting unit 501 and a classifier 502.

The operation principle of the apparatus for image recognition will be explained as follows. The image skin-color area detecting module is adapted to obtain a skin-color or near-skin-color area of an image to be examined. The classifier is adapted to extract at least one area shape feature belonging to a feature set from the skin-color or near-skin-color area, and to recognize the image to be examined according to the at least one area shape feature.

In the embodiment of the present invention, recognition of indecent images is taken as an example. As shown in FIG. 5, the classifier may include a first classifier 5021 and a second classifier 5022.

The first classifier 5021 is adapted to extract at least one first area shape feature belonging to a first feature set from a skin-color or near-skin-color area, where the first feature set is for differentiating a positive-example sample set from a first negative-example sample set which is a scene image set; and to recognize whether the image to be examined is a scene image according to the at least one first area shape feature, and to notify the second classifier 5022 if the image is not a scene image.

The second classifier 5022 is connected with the first classifier 5021, and is adapted to extract at least one second area shape feature belonging to a second feature set from the skin-color or near-skin-color area, where the second feature set is for differentiating the positive-example sample set which is an indecent image set from a second negative-example sample set; and to recognize whether the image to be examined is an indecent image according to the at least one second area shape feature. Here, the first classifier and the second classifier can be implemented as described in the above FIG. 1b, and therefore will not be elaborated herein.

As an embodiment of the present invention, the first classifier or the second classifier is a Bayesian classifier. The Bayesian classifier may include: a posterior probability calculating unit, adapted to calculate a posterior probability that a feature vector of the first feature set belongs to a positive example or a first negative example using the first feature set, and to calculate a posterior probability that the feature vector of the second feature set belongs to the positive example or a second negative example using the second feature set; and a decision unit, adapted to make a Bayesian decision according to the posterior probabilities, and to recognize whether the image to be examined is a scene image or an indecent image.

In addition, it should be noted that, the skin-color area or near-skin-color area of the image to be examined can be obtained by the image skin-color area detecting module following the Bayesian decision method of the priori art or following the technical solution disclosed in the applicant's application document whose application number is CN 2008100841302. The apparatus for indecent image recognition may also include units related to skin-color area or near-skin-color area detection, e.g. a candidate skin-color area extracting unit, adapted to extract a candidate skin-color area image from the image to be detected; an image skin-color area detecting module, adapted to calculate an average value of the chroma of the candidate skin-color area, and to perform skin-color determination for each pixel in the image to be examined according to a skin-color probability model corresponding to a skin-color chroma class whose center is nearest to the average value, and to form the skin-color area of the image by pixels determined as in skin-color. The skin-color chroma class is obtained by dividing skin-color pixels in a training sample set into classes according to a color space. The skin-color probability model is obtained by calculating a distance between an average value of the chroma of a candidate skin-color area in each training sample and the center of the skin-color chroma class, sorting the training sample into a skin-color chroma class having the minimal distance, obtaining training subsets corresponding to the skin-color chroma classes, and calculating a skin-color probability distribution and a non-skin-color probability distribution of each training sample. Thus, the image skin-color area detecting module 501 is adapted to extract a candidate skin-color area from the image to be examined, to calculate the distance between an average value of the chroma of the candidate skin-color area and the center of the skin-color chroma class, and to perform skin-color determination for each pixel in the image to be examined according to the skin-color probability model corresponding to the skin-color chroma class having the minimal distance, and to form a skin-color or near-skin-color area by the pixels determined as in skin color.

The above-described embodiment of the present invention should not be construed as a limit to the scope of the present invention. Any modifications, equivalents or improvements made without departing from the spirit and principle of the present invention are intended to fall into the scope of the present invention as defined by the appended claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for image recognition utilizing an image classifier, comprising:
   obtaining, using a microprocessor, a skin-color or near-skin-color area of an image to be examined; and
   extracting, using a microprocessor, an area shape feature belonging to a feature set from the skin-color or near-skin-color area, and recognizing the image to be examined according to the area shape feature by utilizing the classifier trained using the feature set comprising the area shape feature;
   wherein the extracting an area shape feature belonging to a feature set from the skin-color or near-skin-color area and recognizing the image to be examined comprises:
   extracting at least one first area shape feature belonging to a first feature set from the skin-color or near-skin-color area, wherein the first feature set is for differentiating a positive-example sample set from a first negative-example sample set and the first negative-example sample set is a set of scene images; and recognizing whether the image to be examined is a scene image according to the at least one first area shape feature by utilizing a first classifier trained using the first feature set; if the image is not a scene image,
   extracting at least one second area shape feature belonging to a second feature set from the skin-color or near-skincolor area, wherein the second feature set is for differentiating the positive-example sample set from a second negative-example sample set and the positive-example sample set is a set of indecent images; and recognizing whether the image to be examined is an indecent image according to the at least one second area shape feature by utilizing a second classifier trained using the second feature set;

wherein the method further comprises: before obtaining a skin-color or near-skin-color area of an image to be examined, clustering skin-color pixels in a training sample set according to a color space to obtain at least one skin-color chroma class;

extracting a candidate skin-color area from a training sample, calculating a first distance between an average of chroma of the candidate skin-color area and a center of each skin-color chroma class, sorting the training sample into a skin-color chroma class whose first distance is minimal, and obtaining at least one training subset corresponding to the at least one skin-color chroma class; and calculating a skin-color probability distribution and a non-skin-color probability distribution of each training subset to obtain a skin-color probability model corresponding to each skin-color chroma class, and wherein obtaining a skin-color or near-skin-color area of an image to be examined comprises:

extracting a candidate skin-color area from the image to be examined, calculating a second distance between an average of chroma of the candidate skin-color area and a center of each skin-color chroma class, making a skin-color decision for each pixel in the image to be examined according to the skin-color probability model corresponding to the skin-color chroma class whose second distance is minimal, and forming the skin-color or near-skin-color area by at least one pixel determined as in skin color according to the skin-color decision.

2. A method for image recognition utilizing an image classifier, comprising:

obtaining, using a microprocessor, a skin-color or near-skin-color area of an image to be examined; and extracting, using a microprocessor, an area shape feature belonging to a feature set from the skin-color or near-skin-color area, and recognizing the image to be examined according to the area shape feature by utilizing the classifier trained using the feature set comprising the area shape feature;

wherein the extracting an area shape feature belonging to a feature set from the skin-color or near-skin-color area and recognizing the image to be examined comprises:

extracting at least one first area shape feature belonging to a first feature set from the skin-color or near-skin-color area, wherein the first feature set is for differentiating a positive-example sample set from a first negative-example sample set and the first negative-example sample set is a set of scene images; and recognizing whether the image to be examined is a scene image according to the at least one first area shape feature by utilizing a first classifier trained using the first feature set; if the image is not a scene image, extracting at least one second area shape feature belonging to a second feature set from the skin-color or near-skin-color area, wherein the second feature set is for differentiating the positive-example sample set from a second negative-example sample set and the positive-example sample set is a set of indecent images; and recognizing whether the image to be examined is an indecent image according to the at least one second area shape feature by utilizing a second classifier trained using the second feature set;

wherein recognizing whether the image to be examined is a scene image according to the at least one first area shape feature by utilizing a first classifier comprises:

calculating a posterior probability $P(c_j|x_1x_2 \ldots x_N)$ obtained for the at least one first area shape feature using the first classifier, wherein $j=1, 2$ respectively represent a category of positive examples and a category of first negative examples; and determining whether $P(c1|x_1x_2\ldots x_N)/P(c1|x_1x_2\ldots x_N)+P(c2|x_1x_2\ldots x_N))$ obtained is below a first predetermined threshold, and if yes, determining that the image to be examined is a scene image; otherwise, determining that the image to be examined is not a scene image, and wherein recognizing whether the image to be examined is an indecent image according to the at least one second area shape feature by utilizing a second classifier comprises:

calculating a posterior probability $P(c_j|x_1x_2\ldots x_n)$ obtained for the at least one second area shape feature using the second classifier, where $j=1, 2$ respectively represent the category of the positive examples and a category of second negative examples; and determining whether obtained is below $P(c1|x_1x_2\ldots x_n)/(P(c1|x_1x_2\ldots x_n)+P(c2|x_1x_2\ldots x_n))$ obtained is below a second predetermined threshold, and if yes, determining that the image to be examined is not an indecent image; otherwise, determining that the image to be examined is an indecent image.

3. An apparatus for image recognition, comprising:

an image skin-color area detecting module, adapted to obtain a skin-color or near-skin-color area of an image to be examined; and a classifier, adapted to extract at least one area shape feature belonging to a feature set from the skin-color or near-skin-color area, and to recognize the image to be examined according to the at least one area shape feature;

wherein the classifier comprises a first classifier and a second classifier, and wherein the first classifier is adapted to extract at least one first area shape feature belonging to a first feature set from the skin-color or near-skin-color area, wherein the first feature set is for differentiating a positive-example sample set from a first negative-example sample set and the first negative-example sample set is a set of scene images; and to recognize whether the image to be examined is a scene image according to the at least one first area shape feature, and to notify the second classifier if the image is not a scene image; and the second classifier is operably connected to the first classifier, and is adapted to extract at least one second area shape feature belonging to a second feature set from the skin-color or near-skin-color area, wherein the second feature set is for differentiating the positive-example sample set from a second negative-example sample set and the positive-example sample set is a set of indecent images; and to recognize whether the image to be examined is an indecent image according to the at least one second area shape feature;

wherein the apparatus further comprises:

a candidate skin-color area extracting unit, adapted to extract a candidate skin-color area of the image to be examined, wherein
the image skin-color area detecting module is adapted to extract the candidate skin-color area of the image to be examined, to calculate an average of chroma of the candidate skin-color area, to calculate a distance between the average of chroma of the candidate skin-color area and a center of each skin-color chroma class, and to make a skin-color decision for each pixel in the image to be examined according to a skin-color probability model corresponding to a skin-color chroma class having the smallest distance, and to form the skin-color area by at least one pixel determined as in skin color;
wherein the skin-color chroma class is obtained by clustering skin-color pixels in a training sample set according to a color space;
the skin-color probability model is obtained by: calculating a distance from an average of chroma of a candidate skin-color area of each of a plurality of training samples to a center of each skin-color chroma class, sorting the training samples into a skin-color chroma class whose distance is minimal, obtaining a training subset corresponding to each skin-color chroma class, and calculating a skin-color probability distribution and a non-skin-color probability distribution for training subset.

4. An apparatus for image recognition, comprising:
an image skin-color area detecting module, adapted to obtain a skin-color or near-skin-color area of an image to be examined; and
a classifier, adapted to extract at least one area shape feature belonging to a feature set from the skin-color or near-skin-color area, and to recognize the image to be examined according to the at least one area shape feature;
wherein the classifier comprises a first classifier and a second classifier, and wherein
the first classifier is adapted to extract at least one first area shape feature belonging to a first feature set from the skin-color or near-skin-color area, wherein the first feature set is for differentiating a positive-example sample set from a first negative-example sample set and the first negative-example sample set is a set of scene images; and to recognize whether the image to be examined is a scene image according to the at least one first area shape feature, and to notify the second classifier if the image is not a scene image; and
the second classifier is operably connected to the first classifier, and is adapted to extract at least one second area shape feature belonging to a second feature set from the skin-color or near-skin-color area, wherein the second feature set is for differentiating the positive-example sample set from a second negative-example sample set and the positive-example sample set is a set of indecent images; and to recognize whether the image to be examined is an indecent image according to the at least one second area shape feature;
wherein at least one of the first classifier and the second classifier is a Bayesian classifier, and the Bayesian classifier comprises:
a posterior probability calculating unit, adapted to calculate a posterior probability that a vector comprising the features from the first feature set belongs to a category of positive examples or to a category of first negative examples using the first feature set, and to calculate a posterior probability that a vector comprising features from the second feature set belongs to the category of positive examples or a category of second negative examples using the second feature set; and
a decision unit, adapted to make a Bayesian decision according to the posterior probabilities, and to recognize whether the image to be examined is a scene image or an indecent image.

* * * * *